United States Patent [19]

Mathues et al.

[11] 4,198,823

[45] Apr. 22, 1980

[54] METHOD OF GENERATING BRAKE ACTUATING PRESSURE

[75] Inventors: Thomas P. Mathues, Miamisburg; Donald L. Parker, Middletown, both of Ohio

[73] Assignee: General Motors Corporation, Detroit, Mich.

[21] Appl. No.: 929,690

[22] Filed: Jul. 31, 1978

Related U.S. Application Data

[60] Division of Ser. No. 805,114, Jun. 9, 1977, which is a continuation of Ser. No. 587,148, Jun. 16, 1975, abandoned, which is a continuation of Ser. No. 441,239, Feb. 11, 1974, abandoned.

[51] Int. Cl.² ..................... B60T 13/12; B60T 13/56
[52] U.S. Cl. ..................... 60/547 R; 60/581; 91/167 R; 91/391 R
[58] Field of Search .............. 60/547, 548, 550, 552, 60/553, 554, 562, 581, 582, 585, 592, 593; 91/49, 189, 369, 391 R, 431, 167 R

[56] References Cited

U.S. PATENT DOCUMENTS

| | | | |
|---|---|---|---|
| 3,176,467 | 4/1965 | Van House | 60/548 |
| 3,195,309 | 7/1965 | Cripe | 60/582 |
| 3,371,484 | 3/1968 | Julow | 60/552 |
| 3,766,735 | 10/1973 | Nordeen | 60/550 |
| 3,813,992 | 6/1974 | Brown | 91/189 |

Primary Examiner—Abraham Hershkovitz
Attorney, Agent, or Firm—D. D. McGraw

[57] ABSTRACT

A vehicle brake booster and master cylinder assembly has a vacuum suspended booster section which is controlled by movement of the vehicle brake pedal. A hydraulic booster section is in series with the vacuum suspended booster section, and a master cyclinder unit is in series with the hydraulic booster section. The assembly is so arranged that in normal operation the vehicle operator obtains boosted brake actuating pressures by operation of the vacuum suspended booster which acts through the hydraulic booster mechanism without operating the hydraulic booster. When greater brake actuating pressures are required, as indicated by increased brake pedal force exerted by the operator, the vacuum booster reaches its limit or runout condition and the hydraulic booster is operated so as to continue the increase in master cylinder output pressure. If still further master cylinder output pressure is required when the hydraulic booster has reached its runout condition, the master cylinder is actuated manually through mechanical force transmitting elements which are parts of the booster sections. In one embodiment the assembly utilizes a single hydraulic fluid for the hydraulic booster section and for the master cylinder and brake apply circuitry. In another embodiment the hydraulic booster section is operated by a separate fluid circuit which is fluidly independent of the master cylinder and brake apply pressure circuitry.

3 Claims, 4 Drawing Figures

METHOD OF GENERATING BRAKE ACTUATING PRESSURE

This is a division of application Ser. No. 805,114, filed June 9, 1977, which is a continuation of application Ser. No. 587,148, filed June 16, 1975 (now abandoned), which was a continuation of application Ser. No. 441,239, filed Feb. 11, 1974 (now abandoned).

The invention relates to a method of generating brake actuating pressure, and more particularly to such a method practiced by use of an assembly having in series a vacuum suspended booster section and a hydraulic booster section connected to the master cylinder assembly. It is a feature of the invention to practice the method of generating brake actuating pressure by providing force transmitting paths and valve operating mechanisms interconnecting the two power booster sections so that the sections may be operated independently when power is available to both sections, followed by manual operation if necessary, or either section may be operated when the other section has no power available, followed by manual operation if necessary.

In more particular aspects of the invention as practiced, the connection between the booster sections is provided by two members acting as output members of the vacuum suspended booster section, one member being a sleeve and the other member being a plunger reciprocably received through the sleeve. The sleeve is positioned to operatively engage the hydraulic booster piston and therefore act as one input to the hydraulic booster section, while the plunger is fitted with a valve element for controlling operation of the hydraulic booster section in cooperation with another valve element mounted on the hydraulic booster section power piston. The sleeve and plunger are so arranged that during power operation of the vacuum suspended booster section they move as a unitary member. Therefore the boosted force from the vacuum suspended booster is transmitted through the sleeve to the hydraulic power piston mechanically to the master cylinder unit. Concurrently, the plunger moves with the sleeve and therefore the plunger-connected valve element of the hydraulic booster section moves with the hydraulic power piston connected piston valve element so that no valving action takes place and the hydraulic booster section is not power operated. When the vacuum suspended booster section reaches power runout, which can occur at any point in its operation depending upon the amount of vacuum available, further movement of the input push rod of the vacuum booster section by the vehicle operator establishes a mechanical force transmitting drive connection from the input push rod through the input portion of the vacuum suspended booster section valve to the output plunger so that the output plunger is moved toward the hydraulic booster section relative to the sleeve. This causes the valve elements of the hydraulic booster section to actuate the hydraulic booster section and the power piston thereof is moved in a master cylinder actuating direction under hydraulic power. Thus additional master cylinder output pressure is generated under hydraulic power.

When the hydraulic power booster section reaches power runout, which for the purposes of this disclosure and the appended claims encompasses any power supply condition from complete absence of hydraulic power pressure availability to full actuation of the hydraulic booster section by the maximum hydraulic power normally available, the plunger will move sufficiently to establish a mechanical force transmitting drive connection so that manual force exerted by the vehicle operator on the brake pedal is mechanically transmitted to the master cylinder unit.

In one embodiment by which the invention may be practiced a single hydraulic fluid is used for the hydraulic power section and the brake master cylinder section. In this arrangement the master cylinder reservoir acts as the reservoir for the power steering and hydraulic booster circuitry as well as the brake actuating pressure circuitry. In another embodiment by which the invention may be practiced the master cylinder is separated from the hydraulic booster section and each of these sections is provided with its own hydraulic circuit. In either embodiment the hydraulic booster section is provided with a pressure relief valve which limits the amount of booster power pressure available by opening at a predetermined power pressure to bypass the booster power chamber and thereby prevent undue pressure build-up in the hydraulic booster.

IN THE DRAWINGS

Figure 4:
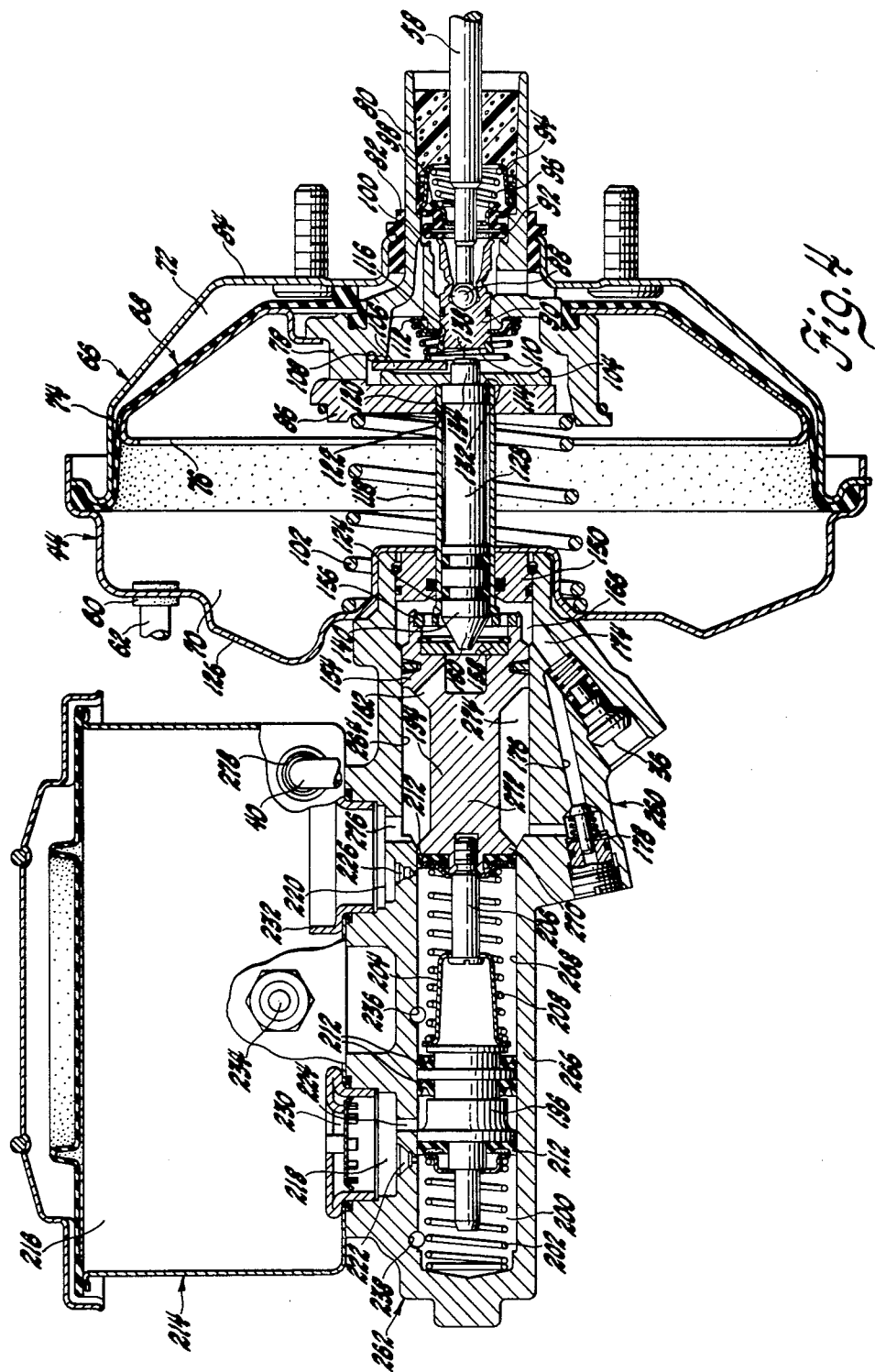
FIG. 4 is a modification of the assembly of FIG. 3, showing the modified assembly in cross section with parts broken away.

The vehicle 10, schematically represented by vehicle portions such as the firewall 12 and a support member 14, is provided with a brake booster and master cylinder assembly 16 embodying the invention. Certain other portions of the vehicle are also schematically illustrated and include the vehicle front wheel brakes 18, rear wheel brakes 20, a pump 22, power steering gear 24, and suitable conduits. These conduits include conduit 26, which interconnects pump 22 and the power steering gear 24 to conduct hydraulic fluid from the pump output port 28 to the power steering gear input port 30. Conduit 32 connects the power steering gear output port 34 with the hydraulic fluid input port 36 of assembly 16. The hydraulic fluid output port 38 of assembly 16 is connected by conduit 40 to the pump 22. In the system schematically illustrated, pump 22 has a fluid reservoir section 42 into which conduit 40 delivers hydraulic fluid. When the modified booster of FIG. 4 is used, pump 22 need not be provided with a reservoir 42 since the master cylinder reservoir acts as the hydraulic fluid system reservoir and conduit 40 is connected between that reservoir and the pump. This arrangement is described below in further detail.

The assembly 16 includes a differential air pressure operated booster section 44, a hydraulic fluid pressure operated section 46, and a master cylinder section 48. The master cylinder section has brake actuating pressure conduits 50 and 52 respectively connecting the pressurizing chambers of the master cylinder with the front wheel brakes 18 and the rear wheel brakes 20. A brake pedal assembly 54 is pivotally mounted on the vehicle support member 14 at pivot 56 and is also connected to push rod 58 to move the push rod generally axially to control the assembly 16 and transmit manual force thereto. The booster section 44 is illustrated as being of the vacuum suspended type and is connected by check valve 60 and conduit 62 to a suitable source of vacuum such as the vehicle engine intake manifold 64.

Figure 3:
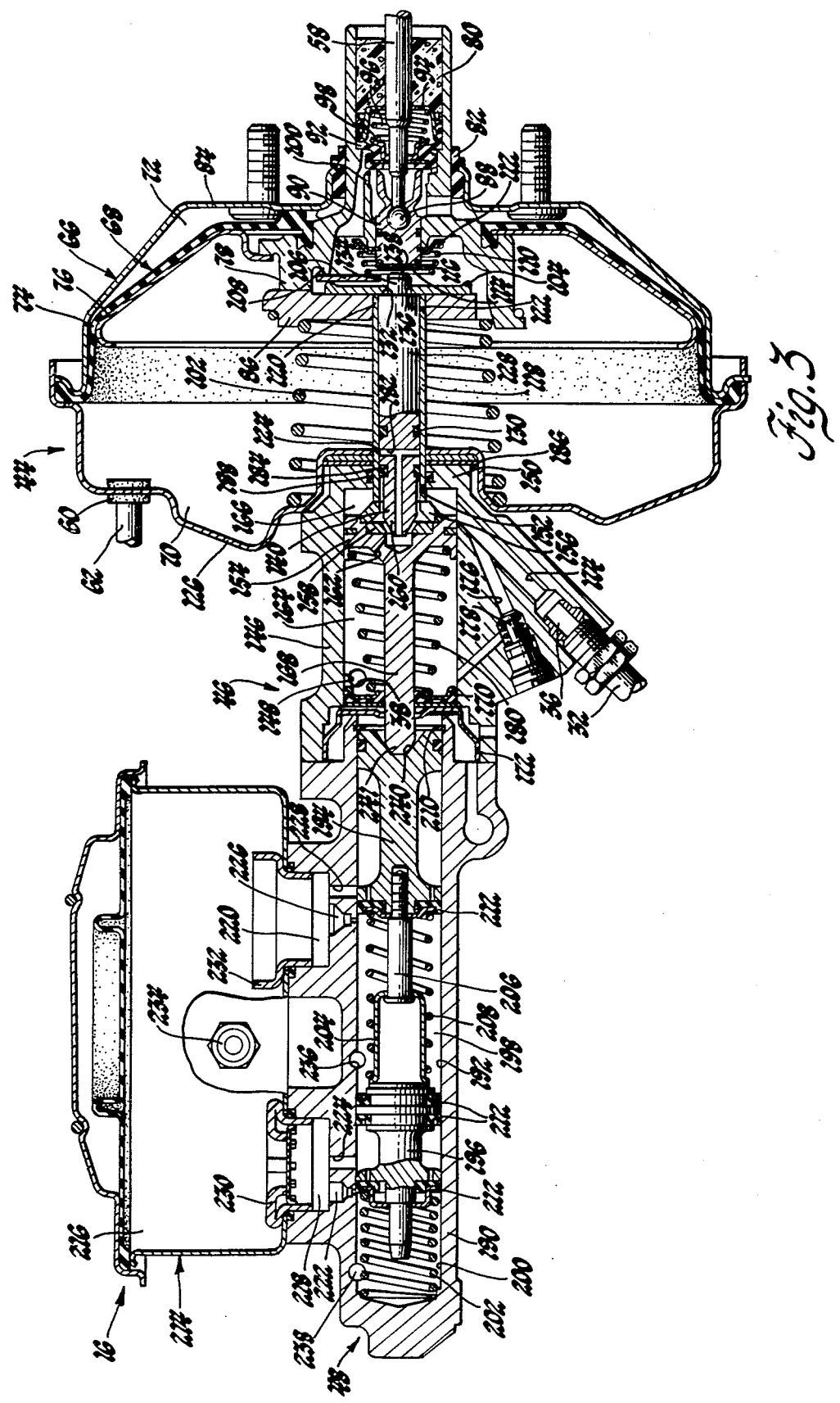
FIG. 3 is a cross section view of a brake booster and master cylinder assembly embodying structure by which the invention may be practiced.

FIG. 3 shows the assembly 16 in cross section and in greater detail. The booster section 44, which may be considered to be the first booster section since it is the first section to be operated, is a vacuum suspended brake booster of the general type disclosed in U.S. Pat. No. 3,249,021, entitled "Power Brake Booster." It is essentially a single diaphragm, vacuum suspended booster having a lever reaction system. It has a housing 66 which has a movable power wall 68 received therein and dividing the housing into a substantially constant pressure chamber 70 and a variable pressure chamber 72. Vacuum is maintained in chamber 70 by check valve 60 and the usual operation of the vehicle engine to which the booster is connected by conduit 62. The power wall 68 includes a diaphragm 74, a diaphragm support 76, and a piston 78 to which the diaphragm and its support are secured. Piston 78 has a rearward extension 80 which is slidable through a seal and bearing 82 provided in the rear section 84 of housing 66. A reaction retainer 86 is removably secured to piston 78. The push rod 58 has a ball end 88 received in a pocket of the air valve 90. Valve 90 is the input member of the valve mechanism which controls this booster section. Ball 88 is staked in place to provide a pivotal connection between rod 58 and air valve 90 but otherwise effectively joining them together as an input member. The air valve 90 is adapted for sliding movement through a portion of piston 78 and is arranged to meter the flow of atmospheric air to chamber 72. A floating valve 92 engages the inside wall of extension 80 of piston 78 and is held in its operative position by a retainer 94. Another portion of the floating valve 92 is maintained in engagement with the air valve 90 when the booster section is in the released position by a spring 96 and cup 98. A vacuum valve 100 is formed as a part of power piston 78 and when the booster section is in the released position floating valve 92 is slightly spaced from this valve so that vacuum is communicated from chamber 70 to chamber 72 through appropriate passages.

As is well known in the operation of this type of booster control mechanism, slight leftward movement of push rod 58 and air valve 90, as viewed in FIG. 3, permits floating valve 92 to engage vacuum valve 100 to close the vacuum connection between chambers 70 and 72. Further movement of the air valve 90 causes the air valve to open relative to floating valve 92 and meter air at atmospheric pressure into chamber 72. This creates a pressure differential across power wall 68, moving the power wall leftwardly against the force of the power wall return spring 102. This also moves vacuum valve 100 and floating valve 92 leftwardly until the floating valve reengages air valve 90. The booster is then in the poised position, holding this position since both the air valve and the vacuum valve are closed. Release of the brake pedal by the operator allows push rod 58 and air valve 90 to move rightwardly, lifting floating valve 92 off of vacuum valve 100, thereby reestablishing the vacuum connection between chambers 70 and 72 and decreasing the differential pressure across power wall 68 so that power wall return spring 102 moves the power wall back to the release position shown in the drawing.

The lever reaction mechanism of booster section 44 includes a lever reaction plate 104, reaction levers 106 disposed against one edge of the lever reaction plate, and a shoulder 108 on piston 78. The reaction mechanism further includes an air valve spring 110, one end of which engages the inner ends of lever 106 and the other end of which is seated on spring retainer 112, which is fastened to air valve 90. The forward face 114 of air valve 90 has a snubber 116 which engages the inner ends of levers 106 and then yields to permit engagement of these lever inner ends with air valve face 114 when the booster is actuated. This arrangement provides a sense of feel to the vehicle operator during operation of the power booster, as is well known in the brake booster art.

The point at which booster section 44 differs from U.S. Pat. No. 2,249,021 in any material extent is in the arrangement of the booster section output mechanism. This mechanism includes a first output formed as a sleeve 118. The rear end 120 of sleeve 118 is slidably received in an aperture 122 of reaction retainer 86, the aperture and sleeve being axially aligned with air valve 90. Sleeve end 120 abuts lever reaction plate 104, and the sleeve forward end 124 extends through the forward section 126 of the booster housing 66 in sliding and sealed relation. A plunger 128 provides the second output of booster section 44 and is slidably received in sleeve 118 and is sealed in sliding relation with the inner wall of that sleeve by seal 130. The rear end of plunger 128 has a shoulder 132 abutting lever reaction plate 104. A reduced diameter extension 134 of plunger 128 extends rearwardly from shoulder 132 through an aperture 136 centrally formed in lever reaction plate 104. The rear face 138 of extension 134 is in alignment with face 114 of the air valve 90 so that sufficient leftward movement of the air valve can cause mechanical engagement of the air valve and the plunger extension in force transmitting relation. The space between faces 114 and 138, with the booster section in the released position illustrated, is sufficient to permit normal valve controlling operation of the booster section so long as there is sufficient power available to operate the booster section. The forward end 140 of plunger 128 extends through and beyond the forward end 124 of sleeve 118 and is formed to provide a valve element of the valve controlling the hydraulic booster section 46 as will be described below.

When the brake booster section 44 is operated by movement of the input member formed by push rod 58 and air valve 90, force is transmitted from the power wall 68 through the reaction levers 106 and reaction plate 104 to sleeve 118 and plunger 128. The inner ends of reaction levers engage the air valve snubber 116 and face 114 to transmit a small amount of reaction force back to the brake pedal so that the operator can sense the amount of brake booster force being generated. The major portion of the reaction force is transmitted to power piston 78 through reaction levers 106 and shoulder 108. The sleeve 118 and plunger 128 will move together due to their arrangement in abutting plate 104, this movement being leftward in the brake applying direction. If the booster section 44 is actuated to a power runout condition, further movement of air valve 90 leftwardly by the manual force exerted on the brake pedal will cause the air valve to engage plunger extension 134 and move the plunger leftwardly relative to sleeve 118. The extension 134 slides in aperture 136 of plate 104, separating shoulder 132 from engagement with the plate. Thus in normal brake booster section actuation both outputs 118 and 128 move in a unitary manner. The relative movement of these outputs, in which plunger 128 moves leftwardly relative to sleeve 118, will occur at any time that the operator exerts sufficient manual force demanding additional output force which the booster section 44 is unable to generate. Thus after vacuum connection 62 is broken, or there is no additional vacuum available from the vacuum source, and the booster chamber 72 is at atmospheric pressure, leftward movement of air valve 90 cannot cause further power actuation of the booster section. Air valve 90 will therefore actuate plunger 128 by transmitting the manual force mechanically thereto as above described. For the purpose of this disclosure and the appended claims, any condition of either booster section in which the booster output force is not sufficient to meet the demand force is referred to as booster power runout. The term therefore includes a total lack of power for operation of a booster section, a partial availability of such power, or conditions wherein the fully available power is present and has been used.

The hydraulic booster section 46 includes a housing 146 having a bore 148 therein, the rear end of the bore having a rear wall 150 through which an opening 152 is provided. A power piston 154 is reciprocably received in bore 148 and provides a power wall for the booster section. An abutment 156 on the rearward side of piston 154 is in engagement with the forward end 124 of sleeve 118, this sleeve forward end extending through opening 152 in sealing relation therewith. Plunger end 140 extends through an opening provided in abutment 156. The valve element 158 is mounted on piston 154 and cooperates with valve element 160 on the forward end of plunger 128 to provide the control valve for the hydraulic booster section 46. This valve is of the open center type and therefore the valve elements are spaced sufficiently apart axially to provide substantially unrestricted flow of hydraulic fluid through the valve so long as the hydraulic booster section is not actuated. Piston 154 has a passage 162 on the low pressure side of valve element 158 which communicates that side of the valve with the exhaust chamber 164. This chamber is on the forward side of piston 154 and is formed by the forward portion of bore 148. The booster section power chamber 166 is on the rearward side of piston 154 and upstream of the valve formed by elements 158 and 160. Piston 154 has a push rod-like extension 168 which extends through chamber 164 and the end seal 170 defining the forward end of that chamber. Extension 168 forms the output member of the hydraulic booster section. It also extends through the end seal support and retainer 172, which has a generally dished annular configuration and is secured in the forward end of housing 146. The housing forward end and this retainer are constructed to provide for a drain and vent which will provide a path for removal of any hydraulic booster fluid which may leak through seal 170 to prevent its possible contamination of master cylinder brake fluid.

Port 36 is connected by passage 174 to power chamber 166. Port 38 is connected to exhaust chamber 164. A pressure relief or bypass valve passage 176 connects passage 174 and chamber 164. Pressure relief valve 178 is mounted in passage 176. The valve is normally closed but is opened when pressure in inlet passage 174 exceeds the predetermined pressure required to open the valve. When the valve opens, it relieves the excess input pressure through passage 176 and exhaust chamber 164 to port 38, conduit 40 and reservoir 42.

The hydraulic booster section is in the position shown in FIG. 3 when released, piston return spring 180 holding the piston abutment 156 against the forward end of sleeve 118. When the vacuum booster section 44 is power operated, sleeve 118 moves piston 154 leftwardly against spring 180, therefore moving the extension 168 in the brake master cylinder actuating direction. Since lever reaction plate 104 moves plunger 128 concurrently as a unit with sleeve 118 in this condition of operation, the valve elements 158 and 160 do not change in their relationship and therefore hydraulic fluid continues to be circulated through the hydraulic booster section without generating a power pressure in chamber 166, and the boosted force exerted through sleeve 118 is mechanically transmitted through abutment 156, piston 154 and extension 168. When for any reason as above described, plunger 128 moves leftwardly relative to sleeve 118, valve element 160 moves toward valve element 158 to restrict flow therethrough and cause a build-up of pressure in power chamber 166. This pressure acts on piston 154 to move the piston leftwardly, the extension or output member 168 therefore moving in the master cylinder actuating direction because of the added force generated by the hydraulic power booster section. The valve elements may reach a poised position wherein the amount of restriction to flow therethrough creates just enough pressure in power chamber 166 to balance power piston 154 against spring 180 and the reaction force from the master cylinder section exerted on extension 168. An annular effective reaction area on plunger 128 exposed to pressure in power chamber 166 will provide a proportional feel to the vehicle operator. It is noted that a T-shaped vent passage 182 in the forward end of plunger 128 vents an area between seal 130 and a similar seal 184 to exhaust chamber 164 so that any hydraulic fluid which might leak past seal 184 will be returned to the hydraulic booster section and will not enter the vacuum booster section. A suitable vent 186 is provided between walls 150 and 126 to prevent the entry of any hydraulic fluid into the vacuum booster section which passes the seal 188 between wall 150 and sleeve 118.

The master cylinder section 48 is of the tandem type in which primary and secondary pistons are received in a common bore and pressurize brake fluid in separate pressurizing chambers for separate brake actuating circuits. The section includes a housing 190 in which bore 192 is formed. Primary pressurizing piston 194 and secondary pressurizing piston 196 are reciprocably received in bore 192 and respectively define therewith primary pressurizing chamber 198 and secondary pressurizing chamber 200. Piston return spring 202 in chamber 200 urges piston 196 against the caged spring retainer 204. This retainer is slidably mounted on headed bolt 206, which is secured to the forward end of primary piston 194. Spring 208 is caged between piston 194 and retainer 204. When the assembly is in the brake released position illustrated this provides a precise positioning of the secondary piston 196. Piston 194 is precisely positioned against its stop 210 and the caging mechanism precisely positions piston 196 relative to piston 194. Suitable cup seals 212 are provided on the pistons, as is well known in the art.

The master cylinder reservoir 214 includes a single primary reservoir section 216 and secondary reservoir sections 218 and 220. Each of the secondary reservoir sections has compensation ports 222, 224 and 226, 228 which provide for compensation of the brake circuits connected to each of the pressurizing chambers. The reservoir construction is based on the disclosure of U.S. Pat. No. 3,937,020, entitled "Master Cylinder" and issued Feb. 10, 1976. The particular construction is claimed in copending U.S. patent application Ser. Nos. 462,335 and 462,355, each entitled "Master Cylinder Assembly and Reservoir For Same" and filed Apr. 19, 1974, now U.S. Pat. Nos. 3,877,228 and 3,886,747, respectively. A baffle 230 is provided for secondary reservoir 218 and a dam 232 is provided for secondary reservoir 220 to increase the capacity of that secondary reservoir. A suitable fluid level sensor 234 is provided in the primary reservoir section 216.

Figure 1:
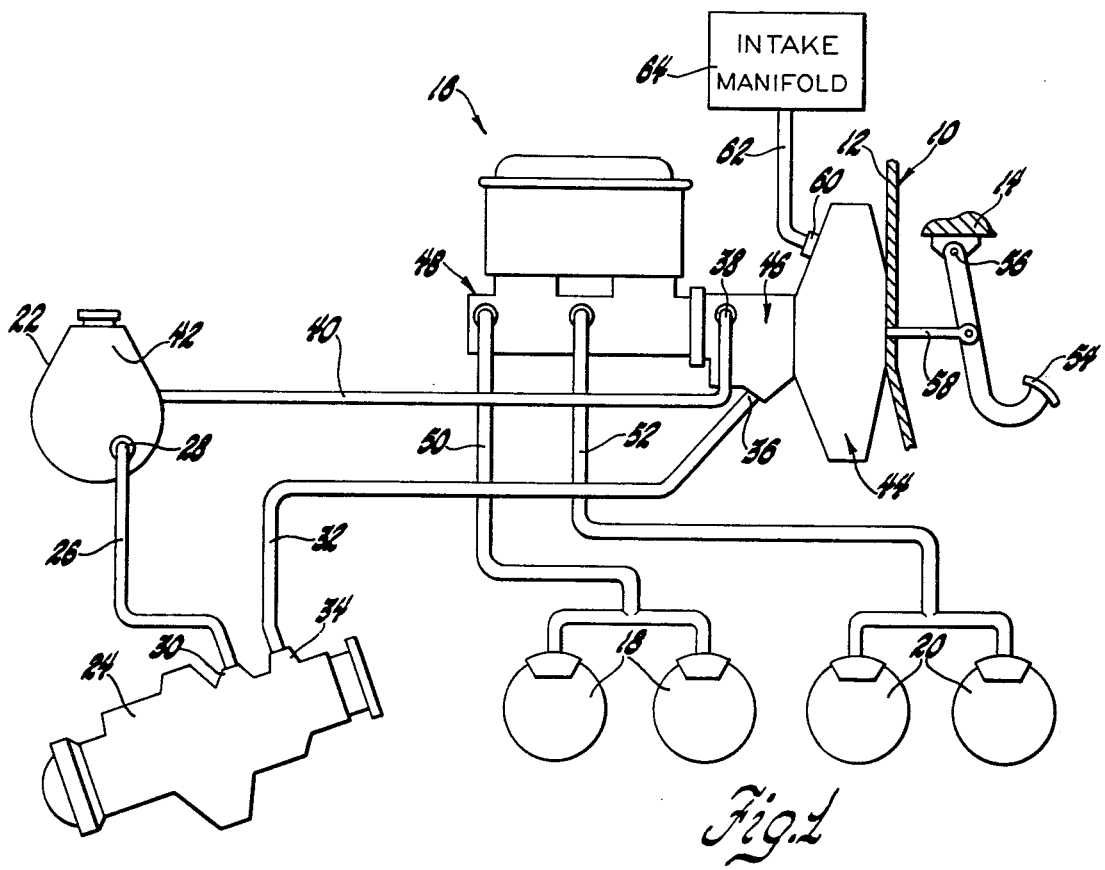
FIG. 1 is a schematic representation of a brake system embodying structure by which the invention may be practiced.

Primary pressurizing chamber 198 is connected by port 236 to brake conduit 52 and secondary pressurizing chamber 200 is connected by port 238 to brake conduit 50. While the schematic illustration of FIG. 1 shows the secondary pressurizing chamber 200 connected to the front brake circuit conduit 50 and the primary pressurizing chamber 198 connected to the rear brake circuit conduit 52, in some installations this may be reversed so that the front brakes are actuated by brake pressure generated in the primary pressurizing chamber 198.

The rear face of piston 194 has a socket 240 which receives the end 241 of extension 168 so that the output member formed by extension 168 is in direct force transmitting and drive relation with piston 194. When output member 168 is moved leftwardly under influence of any force or combination of forces as described above, piston 194 moves leftwardly so that its cup seal 212 closes compensation port 226 and it begins to pressurize fluid in chamber 198. The pressurized fluid and the force exerted through spring 208 combine to move secondary piston 196 leftwardly so that its cup seal 212 closes compensation port 222, the piston continuing to move against the force of return spring 202 to pressurize brake fluid in chamber 200. The brake actuating pressures so generated in chambers 198 and 200 are respectively delivered to the rear brakes 20 and the front brakes 18 to actuate the vehicle wheel brakes.

Figure 2:
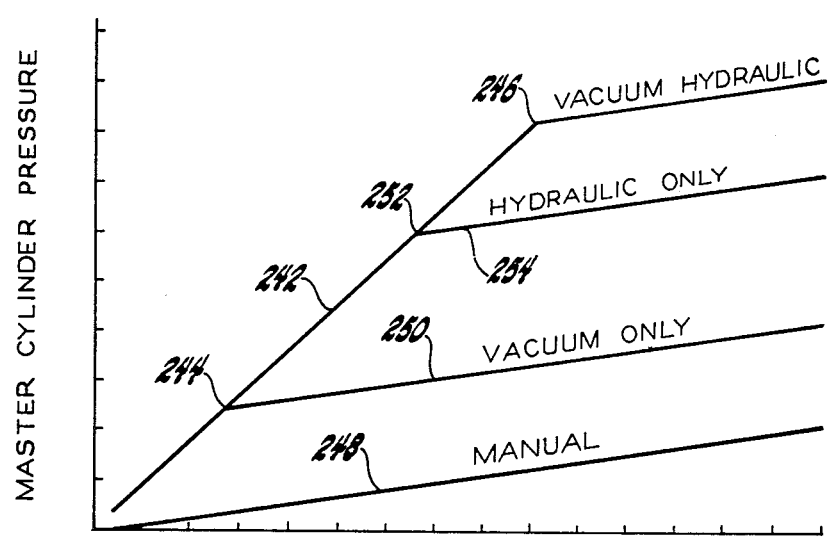
FIG. 2 is a graph indicating the performance of the brake booster under various operating conditions.

It can be seen that the master cylinder can be actuated to generate brake actuating pressure by any of several methods. When the vehicle operator exerts manual force on the brake pedal it is transmitted through push rod 58 to air valve 90 and the vacuum booster section 44. The boosted force is transmitted through sleeve 118, abutment 156, piston 154, and extension 168 to move master cylinder piston 194. As is shown in FIG. 2 of the drawing, in normal brake operation where brake power is available to both booster sections, the master cylinder pressure generated in chambers 198 and 200 will follow along curve 242 with an increase in brake pedal force. The vacuum booster will reach its runout point at 244 on curve 242. The hydraulic booster section will then become operative if the vehicle operator demands more master cylinder pressure than that generated at this point of operation. This is accomplished by moving plunger 128 leftwardly relative to sleeve 118 by mechanical engagement of the air valve 90 with the plunger, restricting hydraulic fluid flow between valve elements 158 and 160 to build up pressure in power chamber 166 and continue actuation of the master cylinder along curve 242 by hydraulic brake boost operation. The hydraulic boost force added to the manual and vacuum boost force will increase with additional pedal force so that the master cylinder pressure may reach point 246. At this point, power runout of the hydraulic booster section occurs and additional pedal force causes a manual additional actuation of the master cylinder section so that the master cylinder pressure follows the portion of curve 242 extending past point 246 at a lesser slope.

Curve 248 of FIG. 2 illustrates the operation of the entire assembly when there is no power pressure available for either booster section and the master cylinder is actuated totally by manual force transmitted mechanically through both booster sections to the master cylinder section 194. Curve 250 of FIG. 2 illustrates the operation of the assembly when vacuum booster section 44 has been actuated along curve 242 to point 244 but no pressure is available to operate the hydraulic booster section 46 and therefore additional force must be applied manually. Point 252 may be reached when the booster has been operated with no power to the vacuum booster section 44. Such operation will cause an immediate operation of the hydraulic booster section 46 when sufficient movement of the air valve 90 has occurred to mechanically engage plunger 28 and additional pedal force is then applied. The master cylinder pressure will increase with pedal force along curve 242 to point 252, which represents hydraulic pressure runout. Additional master cylinder pressure increase follows along curve 254 as additional pedal force is exerted manually through the booster sections to the master cylinder.

The modification shown in FIG. 4 has many parts which are the same as the parts in the structure shown in FIG. 3 and the same reference numerals and descriptions therefore apply. The vacuum booster section 44 is constructed in the same manner and operates as described above. The modified hydraulic booster section 260 operates in the same manner as does hydraulic booster section 46 and the master cylinder section 262 operates to pressurize brake fluid in the same manner as does the master cylinder section 48 of FIG. 3. The differences in construction and arrangement provide for the use of a single hydraulic fluid in the master cylinder section and the hydraulic booster section, with the master cylinder reservoir 214 acting as the hydraulic fluid reservoir for the hydraulic system including the power steering pump, power steering gear, and front and rear wheel brake circuits. To accomplish this, the power piston 194 has its extension modified so that the extension is also the master cylinder primary piston, or may be directly connected thereto. Thus the hydraulic brake booster bore 264 is provided in a common housing 266 with the master cylinder bore 268. The bores intersect shortly to the rear of compensation port 226 at a sloping shoulder, bore 264 being the larger bore. The piston head 270 of power piston extension 272 is reciprocably received in master cylinder bore 268. Exhaust chamber 274 of the hydraulic booster section is located between power piston 194 and piston head 270. Compensation port 276 communicates chamber 274 with the secondary reservoir 220 and through it with the primary reservoir chamber 216 of reservoir 214. By this arrangement hydraulic fluid in reservoir 214 is at all times in fluid communication with the hydraulic brake booster exhaust chamber 274 and also with pump 22 through conduit 40. In this arrangement conduit 40 is connected to reservoir 216 through port 278 in the reservoir wall rather than through port 38 as illustrated in FIGS. 1 and 3.

The invention provides a method of generating brake actuating pressure with numerous advantages over present brake systems. In normal operation it delivers the high performance level obtainable from a hydraulic brake booster, and occupies less space than would a vacuum brake booster of equivalent performance. The two power sources are completely independent of each other so that the assembly will operate if power is provided by either power source. The assembly provides for effective manual operation when no power is available from either or both power sources. It retains the advantageous features of current vacuum powered boosters by having sufficient vacuum stored to provide several power braking stops when the vehicle engine is not running. It lends itself to a basic plumbing circuit requiring only the hydraulic connections to and from the brake booster section when the structure of FIG. 3 is used, or only to the brake booster section and from the master cylinder section reservoir when the construction of FIG. 4 is used. It provides the same brake pedal feel to the vehicle operator that is provided in current production vehicles using vacuum suspended power brake boosters. Since it preferably operates initially with the vacuum booster section to a braking level encompassing the requirements for about eighty percent of the vehicle stops, most vehicle stops may be accomplished without requiring operation of the hydraulic booster section. This substantially reduces the power steering pump duty cycle as compared to hydraulic brake booster systems which require the pump to generate pressure each time the brakes are applied. The system will retain power brake availability when the power steering pump does not run, when the power steering hydraulic circuit loses pressure for any other reason, or when there is a loss of vacuum power for the vacuum booster section. At all times it provides a direct manual follow-through brake actuation upon which the vehicle operator can ultimately rely even if he loses power to both power booster sections.

In some installations it is desirable to utilize different reaction ratios in the two booster sections. For example, the reaction ratio in booster section 44 may be such that the operator receives a relatively small amount of the reaction force to provide feel as compared to that in booster section 46. This would permit the operator to increase the brake actuating pressure to some desired level with a certain desired pedal force, but would require a higher rate of increase in pedal force to further increase brake actuating pressure. This tends to provide a limiting action which would discourage the vehicle operator from generating excess brake actuating pressures during high deceleration stops. In some other installations it may be desirable to utilize a relatively high reaction ratio in booster section 46 and a relatively low reaction ratio in booster section 44. This would result in the generation of brake actuating pressure to a first value with a relatively high pedal force in relation to the brake actuating pressure, and would then permit further brake actuating pressure increase with a smaller increase in brake pedal force. Such an arrangement may be advantageous on roads having widely varying tire-to-road friction characteristics. For example, if a vehicle having such an arrangement is being brake on roads that have ice or snow on them, and also at times dry, this would require a relatively large increase in the brake pedal forces initially applied to obtain comparable increases in brake actuating pressures, thereby giving the vehicle operator an opportunity to modulate the brake actuating pressure precisely. When braking on dry, high-friction characteristic roads, an increase in brake pedal force which would cause booster section 44 to reach its runout limit and then cause actuation of booster section 46 would give a higher rate of increase in brake actuating pressure for a given increase in brake pedal force during actuation of booster section 46. This would give a desired high braking force characteristic when close modulation of the brake actuating pressure would not be necessary.

When the assembly 16 operates in the normal manner with booster section 44 being actuated to its limit, followed by actuation of booster section 46, the reaction ratios obtained are established by the ratio of the contact points on levers 106 for the booster section 44, and the difference in area of plunger 128 and the effective area of valve elements 160 and 162, as exposed to pressure in chamber 166, for booster section 46. In installations where the booster ratios are substantially the same, the rate of increase in brake actuating pressure in relation to the amount of manual force applied through push rod 58 will be substantially the same for each booster section. When the assembly is operated without any vacuum available for power operation of booster section 44, however, the reaction ratio of booster section 46 is modified by the increase in reaction area represented by the area of sleeve end 124 exposed to hydraulic pressure in power chamber 166. This therefore changes the reaction ratio during operation of booster section 46 so that the rate of brake actuating pressure increase is less for a given amount of increase in brake pedal force than is the case when both booster sections are fully operable. It is advantageous to modify the reaction ratio in the hydraulic booster when it is the initially actuated booster so as to improve modulation at low brake actuating pressure levels. The vehicle operator therefore has a greater range of pedal force which may be exerted to obtain a given range of brake actuating pressure than he would have if booster section 46 were actuated with the same reaction ratio under all conditions of operation.

What is claimed is:

1. A method of generating brake actuating pressure comprising the sequential steps of:
   (a) applying a linearly directed manual control force to a member;
   (b) generating a first boosted force applied to a brake actuating pressure generator in linear series with said manual control force, in accordance with the amount of manual control force applied to the member, to a first boosted force limit established by the amount of power available for such generation;
   (c) then generating a second boosted force applied to the brake actuating pressure generator in linear series with said manual control force and said first boosted force, in accordance with the amount of additional manual control force applied to the member, to a second boosted force limit established by the amount of power available for such generation;
   (d) and generating brake actuating pressure by the sum of said forces.

2. A method of generating brake actuating pressure comprising the sequential steps of:
   (a) applying a linearly directed manual control force to a member;
   (b) generating a first boosted force applied to a brake actuating pressure generator in linear series with said manual control force, in accordance with the amount of manual control force applied to the member, to a first boosted force limit established by the amount of power available for such generation;

(c) then generating a second boosted force applied to the brake actuating pressure generator in linear series with said manual control force and said first boosted force, in accordance with the amount of additional manual control force applied to the member, to a second boosted force limit established by the amount of power available for such generation;

(d) further applying increased manual force to the member in series with said other forces beyond said boosted force limits;

(e) the generating brake actuating pressure by the sum of said forces applied to the brake actuating pressure generator.

3. A method of generating a required brake actuating pressure comprising the steps of:

(a) applying a linearly directed manual control force to a member;

(b) subject to power availability generating a first boosted force applied to a brake actuating pressure generator in series with said manual control force and generating brake actuating pressure, in accordance with the amount of manual control force applied to the member, to a first boosted force limit established by the amount of power available for such generation;

(c) subject to power availability generating a second boosted force applied to the brake actuating pressure generator in series with said manual control force and said first boosted force and generating additional brake actuating pressure, in accordance with the amount of additional manual control force applied to the member, to a second boosted force limit established by the amount of power available for such generation;

(d) further applying increased manual force to the member in series with said other forces beyond said boosted force limits;

(e) and generating brake actuating pressure by so much of the sum of said forces applied to the brake actuating pressure generator as is necessary to generate the required brake actuating pressure.

* * * * *

UNITED STATES PATENT OFFICE
CERTIFICATE OF CORRECTION

Patent No. 4,198,823          Dated April 22, 1980

Inventor(s) Thomas P. Mathues, Donald L. Parker

It is certified that error appears in the above-identified patent and that said Letters Patent are hereby corrected as shown below:

Column 4, line 17, "2,249,021" should read 3,249,021.

Column 8, line 22, "28" should read 128.

Column 9, line 63, "brake" should read braked.

Column 11, line 16, claim 2, "the generating" should read and generating.

Signed and Sealed this

Fifteenth Day of July 1980

[SEAL]

Attest:

SIDNEY A. DIAMOND

Attesting Officer      Commissioner of Patents and Trademarks